United States Patent
Kawasaki et al.

(10) Patent No.: US 7,127,729 B2
(45) Date of Patent: Oct. 24, 2006

(54) MAGNETO-OPTICAL HEAD AND MAGNETO-OPTICAL DISK DRIVE

(75) Inventors: Goro Kawasaki, Kawasaki (JP); Tsuyoshi Matsumoto, Kawasaki (JP); Hiroyasu Yoshikawa, Kawasaki (JP); Nobuyuki Kanto, Kawasaki (JP); Tohru Fujimaki, Kawasaki (JP); Koichi Tezuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 403 days.

(21) Appl. No.: 10/806,203

(22) Filed: Mar. 22, 2004

(65) Prior Publication Data

US 2005/0094671 A1    May 5, 2005

(30) Foreign Application Priority Data

Nov. 5, 2003    (JP)    ............................. 2003-375362

(51) Int. Cl.
*G11B 7/08* (2006.01)
*G11B 11/105* (2006.01)

(52) U.S. Cl. ..................... 720/671; 369/13; 369/23

(58) Field of Classification Search .............. 720/671; 369/13.13, 13.23
See application file for complete search history.

(56) References Cited

U.S. PATENT DOCUMENTS

| | | | |
|---|---|---|---|
| 6,584,045 B1 * | 6/2003 | Ishii et al. | 369/13.23 |
| 6,631,099 B1 * | 10/2003 | Kouchiyama | 369/13.33 |
| 6,697,305 B1 * | 2/2004 | Yoshikawa | 369/13.22 |
| 2002/0031056 A1 * | 3/2002 | Penning et al. | 369/13.56 |
| 2002/0097639 A1 * | 7/2002 | Ishizaki et al. | 369/13.13 |
| 2003/0026174 A1 * | 2/2003 | Yoshikawa et al. | 369/13.23 |
| 2003/0099053 A1 * | 5/2003 | Yoshikawa | 360/59 |
| 2004/0246877 A1 * | 12/2004 | Ishizaki et al. | 369/112.23 |

FOREIGN PATENT DOCUMENTS

JP    2003-051144    2/2003

OTHER PUBLICATIONS

Research and Developmetn of Nanometer Control Optical Disk System (magnetic domain response three-dimensional optical memory technology); Development of Technology for Rationalizing the Use of Energy, Optoelectronic Industry and Technology Developement Assoc. Promotion Organization of Next-Generation Optical Memory; Mar. 2003.

* cited by examiner

*Primary Examiner*—Angel Castro
(74) *Attorney, Agent, or Firm*—Greer, Burns & Crain, Ltd.

(57) ABSTRACT

A magneto-optical head including a lens forming a light spot on a storage disk, a magnetic field generating coil arranged between the lens and the disk to surround the optical center of the lens, and an annular heat sink arranged around the coil. The distance between the outer circumference of the coil and the inner circumference of the heat sink is 70–100 μm.

5 Claims, 5 Drawing Sheets

MAGNETO-OPTICAL HEAD AND MAGNETO-OPTICAL DISK DRIVE

BACKGROUND OF THE INVENTION

1. Field of the invention

The present invention relates to a magneto-optical head for writing data to and reading data from a magneto-optical disk. The invention also relates to a magneto-optical disk drive provided with such a magneto-optical head.

2. Description of the Related Art

JP-A-2003-51144, for example, discloses a magneto-optical head used for recording data by magnetic field modulation. The disclosed magneto-optical head includes an optical lens for forming a light spot on a data storage disk, a coil arranged between the lens and the disk for generating a magnetic field, and a magnetic element arranged between the coil and the lens. The coil generates heat when a current flows through the coil. For dissipating the heat, the magneto-optical head is provided with a heat sink surrounding the coil. With this structure, it is possible to prevent the lens from overheating due to the heat of the coil. Thus, the refractive index of the lens remains constant, whereby a proper light spot can be formed. When the disk rotates, airflow is caused between the disk and the MO head, which contributes to the cooling of the heat sink.

In the magnetic field modulation recording system, a high-frequency current of e.g. 50 MHz flows through the coil for magnetic field generation. When a magnetic field is generated by the coil, the magnetic flux passes through the heat sink around the coil. As the direction of the magnetic field is reversed at high frequency, eddy current is generated at the heat sink. The amount of eddy current generated depends on the distance between the outer circumference of the coil and the heat sink. Specifically, the amount of eddy current increases as the distance between the heat sink and the coil decreases and the amount decreases as the distance increases.

When the distance between the heat sink and the coil is relatively small, the heat sink can effectively dissipate the heat generated by the coil. However, the loss due to the eddy current deteriorates the generation efficiency of the magnetic field. On the other hand, when the distance between the heat sink and the coil is relatively large, the generation of eddy current at the heat sink is reduced, so that the generation efficiency of the magnetic field improves. However, the amount of heat dissipated by the heat sink is reduced.

The deterioration of generation efficiency of the magnetic field necessitates the use of a complicated system. Specifically, for example, the current value need be adjusted in accordance with the eddy current loss or the increase of frequency. On the other hand, when the heat dissipation effect lowers, the a proper light spot fails to be formed due to the change of the refractive index of the lens, as described above.

SUMMARY OF THE INVENTION

An object of the present invention, which is conceived under the circumstances described above, is to provide a magneto-optical head capable of minimizing deterioration of the heat dissipation effect of the heat sink and deterioration of generation efficiency of the magnetic field due to eddy current loss.

According to a first aspect of the present invention, there is provided a magneto-optical head comprising: a focus lens for forming a light spot on a disk; a coil for magnetic field generation, the coil being arranged between the lens and the disk and surrounding an optical center of the lens; and an annular heat sink arranged around the coil. The distance between the outer circumference of the coil and the inner circumference of the heat sink is 70–100 µm.

Preferably, the magneto-optical head of the present invention may further comprise an annular magnetic member arranged between the lens and the coil to surround the optical center of the lens.

Preferably, the magneto-optical head of the present invention may further comprise a glass substrate and a transparent dielectric layer. The glass substrate comprises a first surface to which the lens is attached and a second surface opposite to the first surface. The dielectric layer is formed on the second surface of the glass substrate. The magnetic member, the coil and the heat sink are all embedded in the dielectric layer.

Preferably, the magneto-optical head of the present invention may further comprise an additional lens arranged farther from the disk than the focus lens is. The additional lens has an optical center coinciding with the optical center of the focus lens. The additional lens and the focus lens cooperate with each other to provide an integrated numerical aperture of 0.8–0.9. The coil may have an outer diameter of no greater than 300 µm.

According to a second aspect of the present invention, there is provided a magneto-optical disk drive comprising: a lens for forming a light spot on a disk of a surface-recording type; a coil for magnetic-field generation, the coil being arranged between the lens and the disk and surrounding an optical center of the lens; and an annular heat sink arranged around the coil. The distance between the outer circumference of the coil and the inner circumference of the heat sink is 70–100 µm, and the distance between a surface of the disk and the coil is 3–50 µm.

Other features and advantages of the present invention will become clearer from the detailed description given below with reference to the accompanying drawings.

DETAILED DESCRIPTION OF THE PREFERRED EMBODIMENTS

Preferred embodiments of the present invention will be described below in detail with reference to the accompanying drawings.

Figure 1:
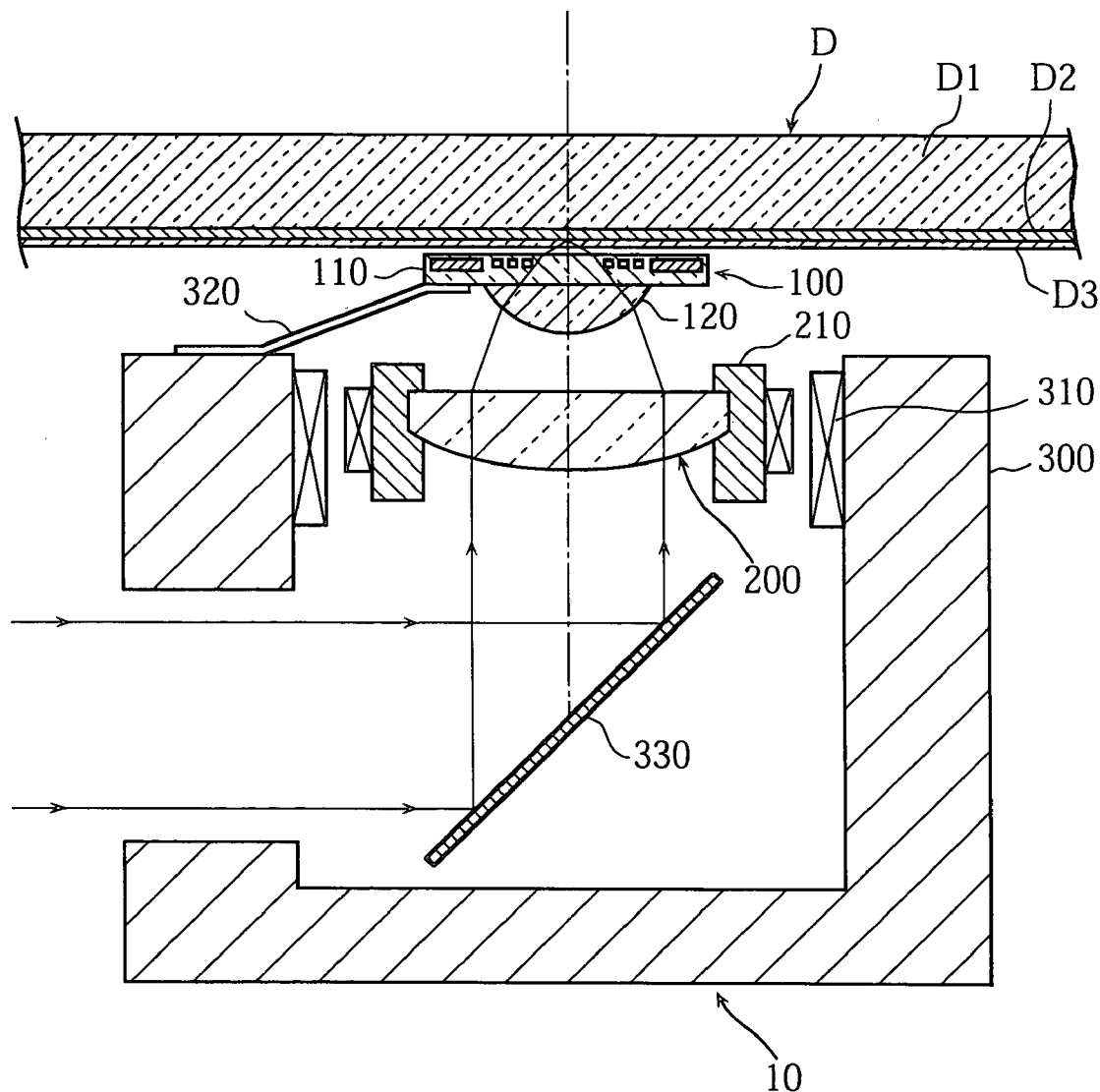
FIG. 1 is a sectional view illustrating a magneto-optical head according to a first embodiment of the present invention.

FIG. 1 schematically illustrates a magneto-optical head 10 according to a first embodiment of the present invention. The magneto-optical head 10 includes, as optical lenses for forming a light spot on a recording layer D2 of a disk D, a first lens member 100 arranged closer to the disk D, and a second lens member 200 arranged farther from the disk D than the first lens member 100. The numerical aperture (NA) to be provided by the two lenses is set to a relatively large value like 0.8–0.9, for example. The disk D is designed as a so-called surface-recording type or front illumination type, for which the optical unit and the magnetic coil for performing the magnetic field modulation are provided on the same side of the storage disk. The disk D comprises a substrate D1, the recording layer D2 formed on a surface of the substrate D1, and a transparent protective layer D3 in the form of a thin film covering the recording layer D2. The magneto-optical head 10 emits laser beams toward the recording layer D2 of the disk D to form a light spot on the recording layer D2.

The second lens member 200 is held by a holder 210. The holder 210 is microactuated by an electromagnetic actuator 310 at least in the tracking direction relative to a carriage 300 which can perform seek movement in the radial direction of the disk D. The first lens member 100 is supported by the carriage 300 via a suspension 320 which can be elastically deformed. The suspension 320 elastically biases the first lens member 100 toward the disk D. The first lens member 100 and the second lens member 200 are so arranged that respective optical centers are located on a common axis. In the carriage 300 is also disposed an upwardly reflecting mirror 330 arranged below the second lens member 200 and inclined at 45° relative to the horizontal direction. Thus, parallel laser beams travelling from a fixed optical unit (not shown) in the horizontal direction is reflected by the mirror 330 toward the second lens member 200 and the first lens member 100. As noted above, the first lens member 100 together with the second lens member 200 forms a light spot on the recording surface of the disk D. The non-illustrated optical unit is provided with a beam splitter and a photodetector. After the laser beams are reflected by the recording layer D2, the photodetector detects the reflected light.

Figure 2:
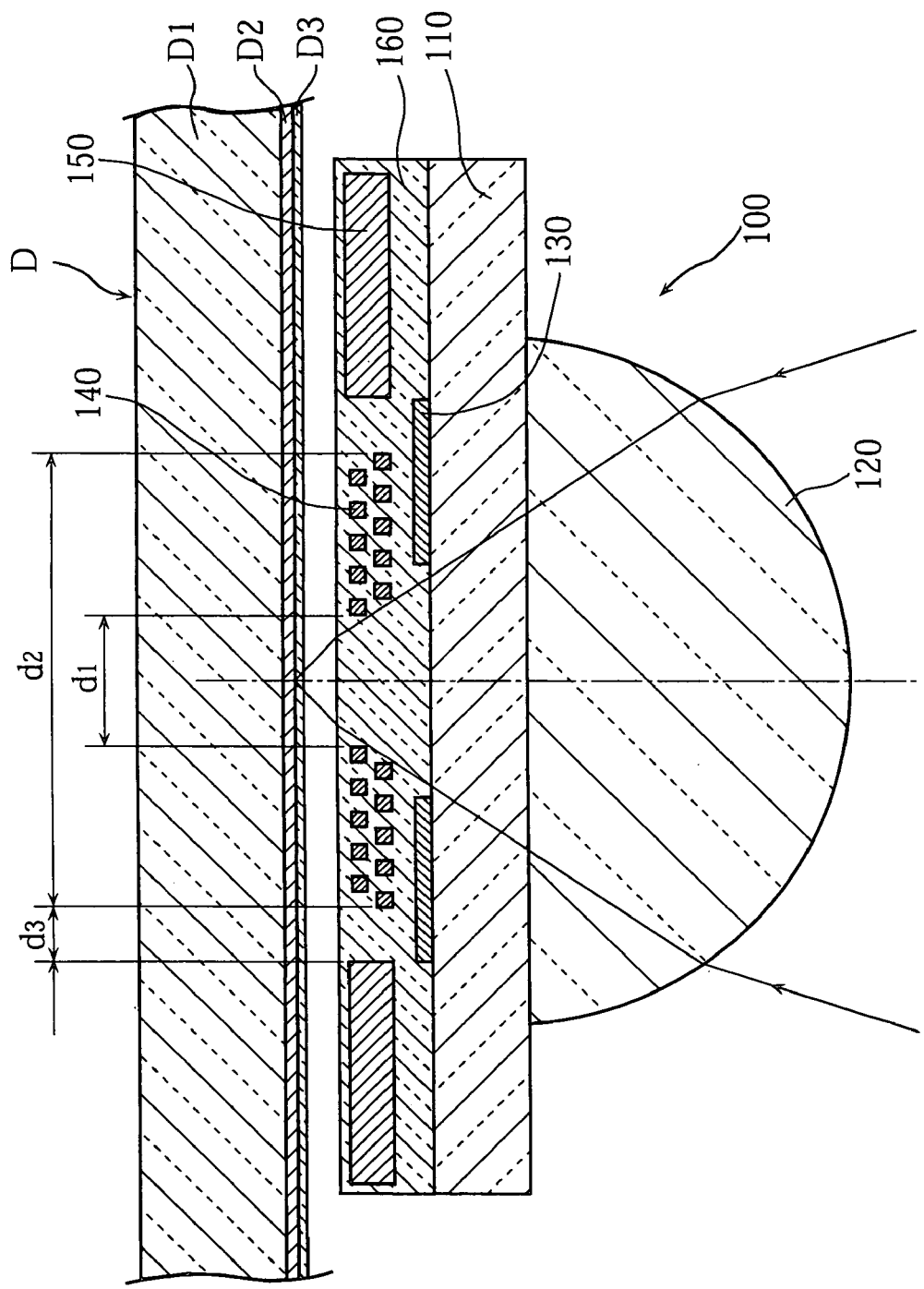
FIG. 2 is an enlarged sectional view of a principal portion of the magneto-optical head shown in FIG. 1.

Next, with reference to FIG. 2, the structure of the first lens member 100 will be described in detail in relation to the disk D. As shown in FIG. 2, the first lens member 100 comprises a transparent glass substrate 110, a generally semispherical lens 120 bonded to a surface of the glass substrate 110 opposite to the disk D, a magnetic layer 130, a coil 140, and a heat sink 150. The magnetic layer 130 is formed on the disk D-side surface of the glass substrate 110 and embedded in a transparent dielectric layer 160 by a semiconductor thin film formation process.

The magnetic layer 130 is made of an alloy mainly composed of nickel, iron or cobalt and has a relatively high saturation flux density. The magnetic layer 130 may be a doughnut-like circular plate having a thickness of 1 to 100 μm and an inner diameter for allowing laser beams to passing through the inside of the magnetic layer.

The coil 140 can generate a perpendicular magnetic field at a region of the disk D where a light spot is to be formed. The coil 140 has a spiral or a concentric shape surrounding the optical center axis of the first lens member 100 and laser beams passing therethrough and having a minimum inner diameter d which is so set as not to block the laser beams. In this embodiment, the coil 140 has a two-layer structure. For example, the coil 140 may be made of copper by the semiconductor thin film formation process. The line element of the coil 140 may have a thickness and a width of 1 to 100 μm.

The heat sink 150 may comprise a doughnut-like circular plate arranged in the same layer as the coil 140 to surround the coil 140. As the material of the heat sink 150, use may be made of a good heat conductor such as gold, silver or copper, for example. However, it is most preferable to make the heat sink 150 using the same material as the coil, i.e. copper, because, in that case, the heat sink 150 can be made in the same formation process as the coil 140.

As noted above, in the magneto-optical head 10, the first lens member 100 is biased toward the disk D by the suspension 320. When the magneto-optical head 10 is made close to the disk D during the rotation of the disk D, the first lens 100, functioning as a slider, floats from the surface of the disk D, with a gap of 3–5 μm. In view of such a relationship with the disk D, when the numerical aperture to be provided by the first lens member 100 and the second lens member 200 is 9, the inner diameter d1 of the coil 140 may be e.g. 100 μm, which ensures that the laser beams passing through the first lens member 100 are not blocked by the coil. Accordingly, in view of e.g. the strength of the intended magnetic field and the impedance, the outer diameter d2 of the coil 140 may be no more than 300 μm and preferably about 200 μm.

During the recording by the magnetic field modulation, an alternating current of 20–50 MHz flows through the coil 140. As a result, a perpendicular alternating magnetic field is generated at a portion where a light spot is to be formed, which corresponds to the core region of the coil 140. The magnetic layer 130 prevents the magnetic field from spreading below the magnetic layer 130, whereby the generation of the perpendicular magnetic field can be performed efficiently.

When the alternating current flows through the coil 140, the coil 140 heats up. Accordingly, the temperature of the dielectric layer increases at the core region of the coil 140. Such a temperature increase should be suppressed as much as possible for preventing the change of the properties, such as refractive index, of the first lens member 100 so that reading/writing errors will not occur. The heat sink 150 dissipates the heat generated at the coil 140 to the outside. In this embodiment, the heat sink 150 is embedded in a portion close to the disk D-side surface of the first lens member 100. Therefore, the cooling effect is enhanced by the airflow generated between the first lens member 100 and the disk D during the rotation of the disk D. Obviously, the closer the inner circumference of the heat sink 150 is to the coil 140, the higher the cooling effect is. However, when the heat sink 150 is too close to the coil 140, a large amount of magnetic flux generated by the coil 140 traverses the heat sink 150, which leads to greater eddy-current loss. Heretofore, no study has been done to search for optimum positional relationship between the coil 140 and the heat sink 150, and the present invention is the first to find out the optimum positional relationship between the coil 140 and the heat sink 150 in the magneto-optical head 10 of this kind.

Figure 3:
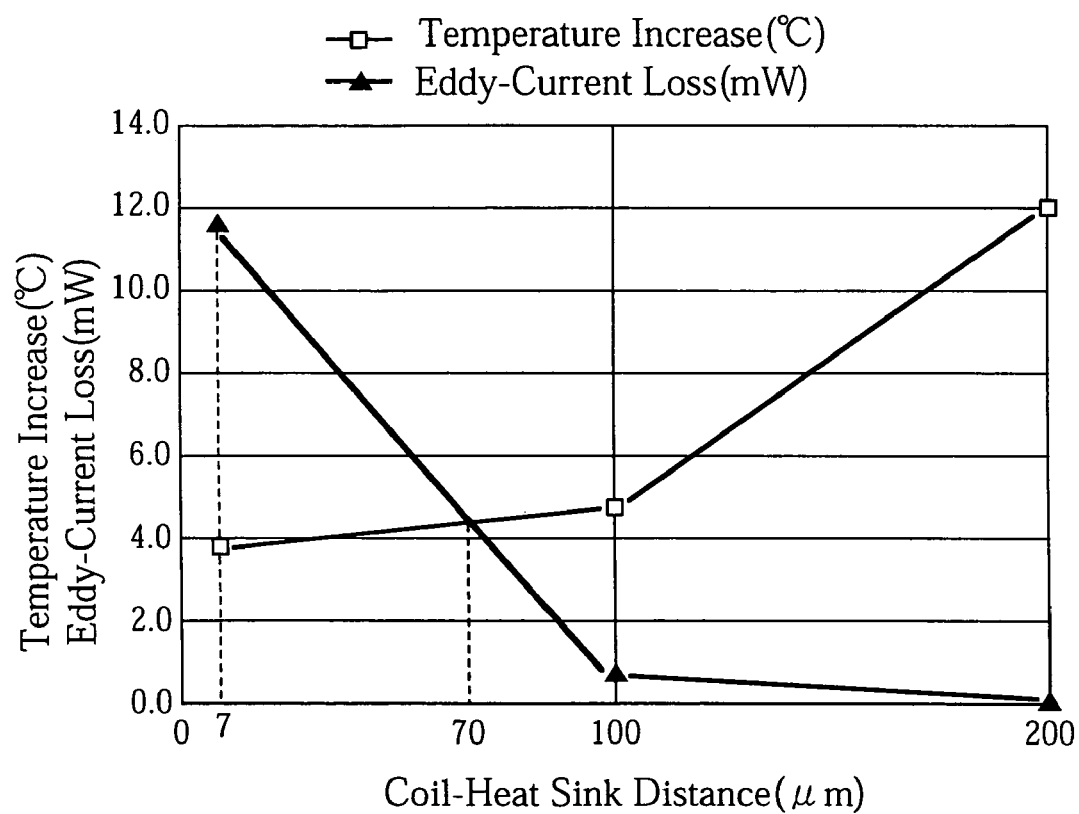
FIG. 3 is a graph showing simulation values of temperature increase at the coil core portion and the eddy-current loss of the heat sink relative to the coil-heat sink distance.

FIG. 3 is a graph showing simulation values of temperature increase at the core portion of the coil 140 of the first lens member 100 and the eddy-current loss of the heat sink 150 relative to the coil-heat sink distance d3 when a magnetic field of 2000$e$ is generated by the coil 140 (the lens-disk distance is 7 μm). Herein, the coil-heat sink distance d3 means the distance between the outer circumference of the coil 140 and the inner circumference of the heat sink 150 (See FIG. 2). In the graph, the respective values when the coil-heat sink distance d3 is 7 μm, 100 μm or 200 μm are shown. As shown in the graph, the eddy-current loss is small when the coil-heat sink distance exceeds 100 μm, while the eddy-current loss sharply increases particularly when the coil-heat sink distance d3 is smaller than 70 μm. The temperature at the coil core sharply increases when the coil-heat sink distance d3 exceeds 100 µm, which means that the heat dissipation effect is considerably deteriorated. From the above, it is found that the coil-heat sink distance d3 should not exceed 100 µm in view of the heat dissipation effect but should not be smaller than 70 µm in view of the eddy-current loss. Therefore, to ensure good heat dissipation effect by the heat sink 150 while suppressing the eddy-current loss to an allowable level, it is preferable that the coil-heat sink distance d3 is within a range of about 70–100 µm.

Figure 4:
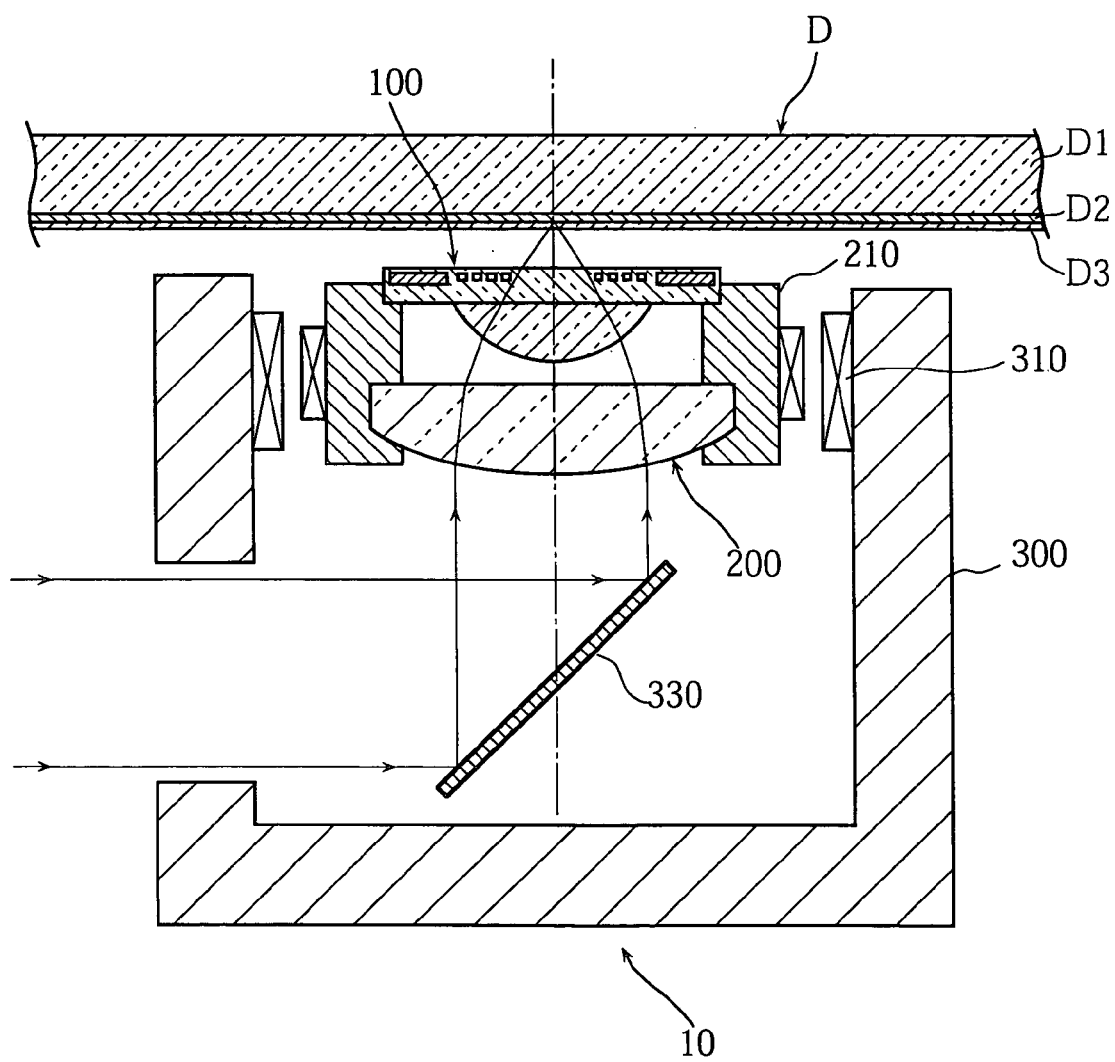
FIG. 4 is a sectional view illustrating a magneto-optical head according to a second embodiment of the present invention.

FIG. 4 schematically illustrates a magneto-optical head 10 according to a second embodiment of the present invention. In the magneto-optical head 10 of this embodiment again, a high numerical aperture (NA) is provided by a first leans member 100 arranged closer to the disk D and a second lens member 200 arranged farther from the disk D than the first lens member 100 as lenses for forming a light spot on a recording layer D2 of the disk D. In this embodiment, however, both of the two lenses are held by a holder 210 which is microactuated in the tracking direction and in the focusing direction by an electromagnetic actuator 310. Below the second lens member 200 is provided an upwardly reflecting mirror 320. The mirror 320 reflects laser beams emitted from a fixed optical unit (not shown), whereby the laser beams become incident on the second lens member 200 and the first lens member 100. The laser beams form a light spot on the recording layer D2 of the disk D by the operation of the first lens member 100 and the second lens member 200. The light reflected by the disk D travels along the above-described path in the reverse direction to return to the fixed optical unit. In the fixed optical unit, a focus error signal and a tracking error signal are generated. Based on the signals, the electromagnetic actuator 310 is driven to perform control so that a proper light spot is formed on a track of the disk D.

Similarly to the first lens member of the first embodiment, the first lens member 100 of this embodiment may include a magnetic layer 130, a coil 140 and a heat sink 150 embedded in a transparent dielectric layer 160. In this embodiment, however, the surface-to-surface distance between the first lens member 100 and the disk D is 30–50 µm. Since the distance of the first lens member 100 from the disk D is larger than that of the first lens member 100 of the first embodiment which is of a floating slider type, the inner diameter d1 of the coil 140 need be correspondingly larger than the first embodiment, although the necessary inner diameter d1 varies depending on the intended numerical aperture of the two lenses.

In this embodiment again, there exists a proper value of the coil-heat sink distance d3 which can ensure good heat dissipation effect by the heat sink 150 while suppressing the eddy-current loss.

Figure 5:
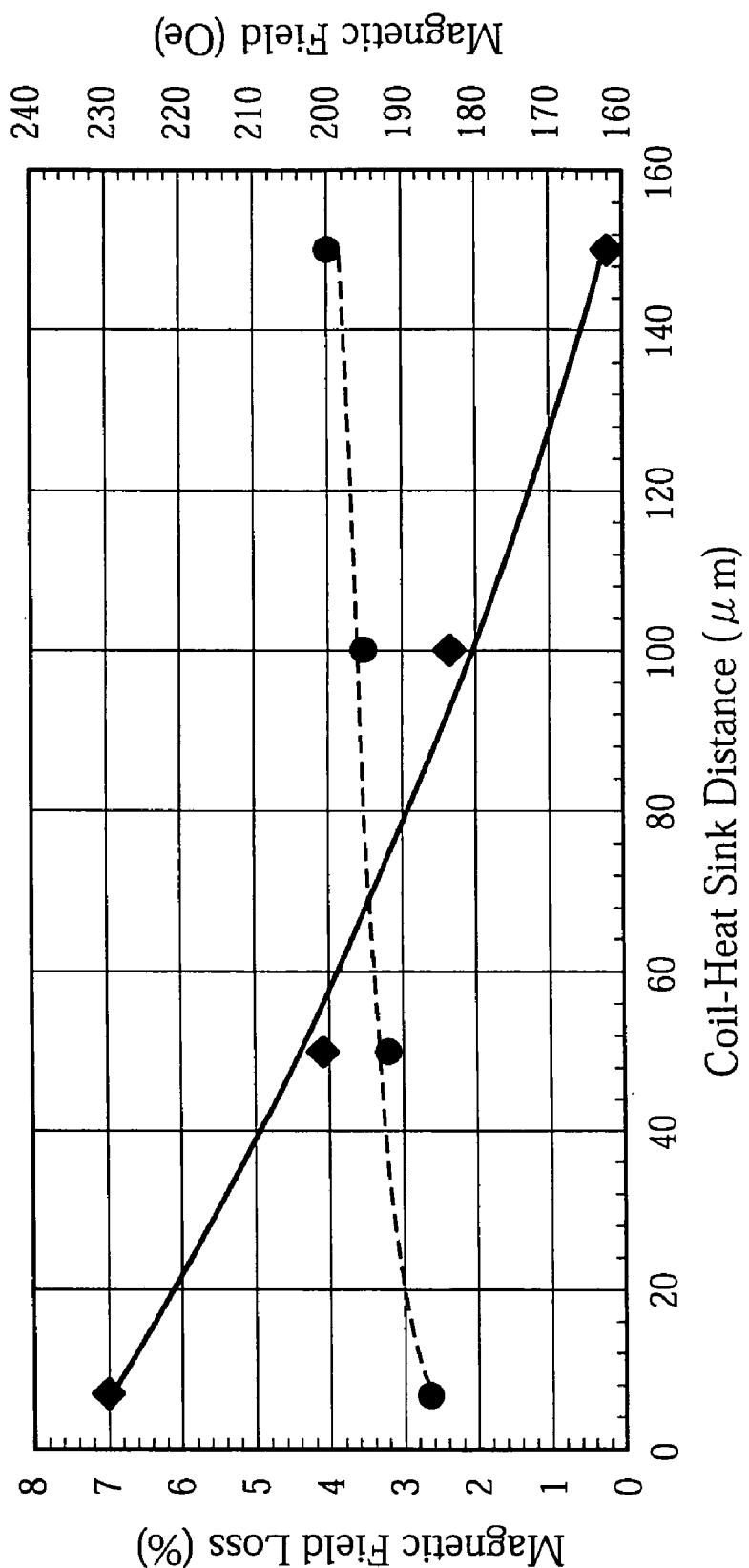
FIG. 5 is a graph showing the loss of a magnetic field (corresponding to the eddy-current loss) relative to the coil-heat sink distance.

FIG. 5 is a graph showing the loss of a magnetic field (corresponding to the eddy-current loss) relative to the coil-heat sink distance d3 when the distance between the first lens member 100 and the disk D is 30 µm. As is clear from the graph, the loss of the magnetic field can be suppressed to no more than 3% when the coil-heat sink distance d3 is approximately no less than 70 µm. The heat dissipation efficiency in this embodiment has a tendency which is similar to that shown in FIG. 3. Therefore, in this embodiment again, it is preferable that the coil-heat sink distance d3 is set to no more than 100 µm from the viewpoint of the heat dissipation efficiency of the heat sink 150. Thus, it is preferable to set the coil-heat sink distance d3 to a range of about 70–100 µm for ensuring good heat dissipation effect by the heat sink 150 while suppressing the eddy-current loss to an allowable level.

As described above, according to the present invention, the distance between the coil 140 and the heat sink 150 in the magneto-optical head 10 of a surface-recording type is set to an optimum value. Therefore, heat generated at the coil 140 can be efficiently dissipated to the outside without receiving adverse affect, by the eddy-current loss which is caused during high-frequency driving. Moreover, the generation of eddy current at the heat sink 150 can be suppressed even with the use of a simple circuit structure, and the temperature increase can be suppressed to the minimum.

The invention claimed is:

1. A magneto-optical head comprising:
a focus lens for forming a light spot on a disk;
a coil for magnetic field generation, the coil being arranged between the lens and the disk and surrounding an optical center of the lens; and
an annular heat sink arranged around the coil;
wherein a distance between an outer circumference of the coil and an inner circumference of the heat sink is 70–100 µm.

2. The magneto-optical head according to claim 1, further comprising an annular magnetic member arranged between the lens and the coil to surround the optical center of the lens.

3. The magneto-optical head according to claim 2, further comprising a glass substrate and a transparent dielectric layer, wherein the glass substrate comprises a first surface to which the lens is attached and a second surface opposite to the first surface, the dielectric layer being formed on the second surface to embed the magnetic member, the coil and the heat sink.

4. The magneto-optical head according to claim 3, further comprising an additional lens arranged farther from the disk than the focus lens is, wherein the additional lens has an optical center coinciding with the optical center of the focus lens, the additional lens and the focus lens cooperating with each other to provide an integrated numerical aperture of 0.8–0.9, and wherein the coil has an outer diameter of no greater than 300 µm.

5. A magneto-optical disk drive comprising:
a lens for forming a light spot on a disk of a surface-recording type;
a coil for magnetic field generation, the coil being arranged between the lens and the disk and surrounding an optical center of the lens; and
an annular heat sink arranged around the coil;
wherein a distance between an outer circumference of the coil and an inner circumference of the heat sink is 70–100 µm, and wherein a distance between a surface of the disk and the coil is 3–50 µm.

* * * * *